Patented Feb. 15, 1938

2,108,606

UNITED STATES PATENT OFFICE 2,108,606

TRIFLUOROMETHYL - PHENYLSULPHIDES, OXIDATION PRODUCTS THEREOF AND PROCESS OF PREPARING THE SAME

Fritz Müller, Otto Scherer, and Willy Schumacher, Frankfort-on-the-Main, Germany, assignors to General Aniline Works, Inc., New York, N. Y., a corporation of Delaware No Drawing. Application April 13, 1937, Serial No. 136,688. In Germany April 18, 1936

8 Claims. (Cl. 260—142)

The present invention relates to trifluoromethylphenylsulphides, oxidation products thereof and to a process of preparing the same; more particularly it relates to compounds of the following general formula:

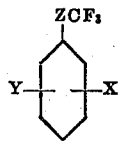

wherein Z stands for S or $SO_2$, X stands for hydrogen, halogen, alkyl, nitro, $CF_3$, $SCF_3$ or $SO_2CF_3$, Z being S in case X stands for $SCF_3$, and $SO_2$ in case X stands for $SO_2CF_3$, and Y stands for hydrogen or halogen.

Trifluoromethylphenylsulphones of the formula $R-SO_2-CF_3$, wherein R represents a benzene radical, which may contain substituents, have not hitherto been known. We have found that trifluoromethyl-phenylsulphones are obtainable in an easy way by causing technically anhydrous hydrogen fluoride or antimony trifluoride to act, at a raised temperature, upon a compound of the formula:

wherein the benzene nucleus may contain a further $SCCl_3$-group or other substituents, and subsequently oxidizing the trifluoromethylphenylsulphides thus obtained. It is surprising that the trichloromethylphenylsulphides can react in this manner with hydrogen fluoride, since it is well known, that ethers are very easily split up by means of hydrogen halide with formation of the corresponding alkyl halides.

The trichloromethylphenylsulphides used as parent materials may easily be obtained in the manner described by Zincke, "Berichte der Deutschen Chemischen Gesellschaft", vol. 43, page 845.

The fluorination by means of technically anhydrous hydrogen fluoride or antimony trifluoride occurs very smoothly and the trifluoromethylphenylsulphides are obtained with very good yields. The sulphides can easily be oxidized by means of the usual oxidizing agents to the corresponding trifluoromethylphenylsulphones, which are valuable parent materials, for instance, for the manufacture of dyestuffs, pharmaceutical products, fungicides and/or insecticides.

The following examples serve to illustrate the invention, but they are not intended to limit it thereto; the parts are by weight, unless otherwise stated:—

(1) 554 parts of trichloromethylphenylsulphide are mixed with 132 parts of technically anhydrous hydrogen fluoride in an iron vessel resistant to pressure. The vessel is heated to a temperature of about 50° C. to 100° C., whereby pressure is very quickly produced. The hydrogen chloride which has been split off is allowed to escape through a valve. After 2 to 3 hours the reaction is finished. The trifluoromethylphenylsulphide is then distilled and is obtained with a yield of about 90 per cent in the form of a colorless liquid boiling at a temperature of 140° C. to 142° C.

267 parts of trifluoromethylphenylsulphide are mixed with 550 parts by volume of a solution containing 210 parts of chromic anhydride and 200 parts of sulphuric acid. The mixture is heated for about 15 hours to a temperature of about 100° C. to 130° C., while vigorously stirring. The trifluoromethylphenylsulphone of the formula:

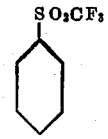

thus obtained is then distilled with steam. It is obtained in a yield of more than 90 per cent. in the form of a colorless liquid boiling at 203° C. to 205° C.

(2) 262 parts of para-chloro-trichloromethylphenyl sulphide are mixed, in an iron vessel provided with a rectifying column, with 190 parts of antimony trifluoride. The vessel is heated to a temperature of about 200° C. The para-chloro-trifluoromethylphenylsulphide thus obtained is distilled. It is a liquid clear as water, boiling at 173° C. to 174° C.

212 parts of para-chloro-trifluoromethylphenyl sulphide are dissolved in 500 parts by volume of glacial acetic acid. While stirring, 150 parts of chromic anhydride are slowly introduced at about 50° C. Thereafter, the liquid is heated, for about half an hour, to a temperature of 100° C. The whole is then diluted with water and the para-chloro-trifluoromethylphenylsulphone of the formula:

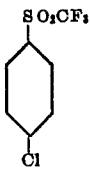

which has separated is filtered with suction. It melts at 55° C. to 56° C. Instead of para-chlorotrichloromethylphenylsulphide there may be used other halogen-substitution products of trichloromethylphenyl sulphide such as, for instance, the ortho- or meta- chloro-derivative, mono-bromo-derivatives, poly-chloro-derivatives or poly-bromo-derivatives. There is, for instance, obtained from ortho-chlorotrichloromethylphenylsulphide the ortho-chloro-trifluoromethylphenylsulphide boiling under a pressure of 15 mm. at 69° C. to 72° C., and therefrom by oxidation the ortho-chlorotrifluoromethylphenylsulphone boiling under a pressure of 17 mm. at 120° C. to 123° C.

The meta-chloro-trifluoromethylphenlsulphide boils under a pressure of 12 mm. at 58° C. to 62° C. and the 3.4-dichloro-1-trifluoromethylphenylsulphide boils under a pressure of 10 mm. at 82° C. to 85° C.

From the 2,5-dichloro-1-trichloromethylphenylsulphide the 2,5 - dichloro-1-trifluoromethylphenylsulphide is obtained which boils under a pressure of 11 mm. at 82° C. to 86° C., and from this compound there is obtained by oxidation the 2,5 - dichloro - 1 - trifluoromethylphenylsulphone melting at 50° C. The 2,4-dichloro-1-trifluoromethylphenylsulphide boils under a pressure of 10 mm. at 83° C. to 86° C. and the corresponding 2,4-dichloro-1-trifluoromethylphenylsulphone under a pressure of 12 mm. at 128° C. to 130° C.

(3) In a manner similar to that described in Example 1 the para-trifluoromethyltolylsulphide boiling at 163° C. to 167° C. is obtained from para-trichloromethyltolylsulphide by heating with technically anhydrous hydrogen fluoride at a temperature between 100° C. and 160° C. By oxidizing, there is obtained from this compound the para-trifluoromethyltolylsulphone, melting at 34° C. to 35° C. and having the formula:

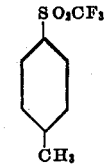

Here also there may be used with advantage instead of para-trichloromethyltolylsulphide other substitution products of trichloromethylphenylsulphide, for instance, ortho- and meta-trichloromethyltolylsulphide, poly-methyl-derivatives or derivatives containing halogen and methyl groups. The reaction occurs also in a smooth way, if the benzene radical contains several trichloromethylsulphide groups as substituents. Thus, there are obtained, for instance, from phenyl-1,3-bis-trichloromethylsulphide the phenyl - 1,3 - bis-trifluoromethylsulphide boiling under a pressure of 18 mm. at 88° C. to 93° C., and therefrom by oxidizing the phenyl-1,3-bis-trifluoromethylsulphone of the formula:

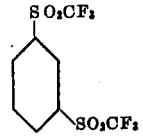

It melts at 75° C. to 76° C. From the mono- or polyhalogen-substitution products, the mono- or polymethyl-substitution products or the derivatives of the phenyl-bis-trichloromethylsulphides substituted by halogen and methyl groups there are obtained the corresponding substitution products of the phenyl-bis-trifluoromethylsulphones.

(4) In a manner similar to that described in Example 1 there is obtained from 4-nitro-1-trichloromethylphenylsulphide, obtainable, for instance, in the manner described by Zincke, "Berichte der Deutschen Chemischen Gesellschaft", vol. 43, page 3444, annotation 3, the 4-nitro-1-trifluoromethylphenylsulphide boiling under a pressure of 20 mm. at 115° C. and solidifying at 30° C. By oxidizing this compound, the 4-nitro-1-trifluoromethylphenylsulphone of the formula:

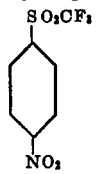

is obtained. It melts at 85° C. to 86° C.

Instead of 4-nitro-1-trichloromethylphenylsulphide there may also be used derivatives containing further substituents as, for instance, halogen. From 4-nitro-2-chloro-1-trichloromethylphenylsulphide there is obtained the 4-nitro-2-chloro-1-trifluoromethylphenylsulphide boiling under a pressure of 17 mm. at 130° C. to 133° C. and therefrom by oxidizing the 4-nitro-2-chloro-1-trifluoromethylphenylsulphone which boils under a pressure of 17 mm. at 170° C. to 172° C. and solidifies at 36° C.

The 4-nitro-3-trifluoromethyl-1-trifluoromethylphenylsulphide which boils under a pressure of 15 mm. at 100° C. to 105° C. is obtained from 4 - nitro - 3 - trichloromethyl -1- trichloromethylphenylsulphide.

(5) In a manner similar to that described in Example 1 the 3-nitro-1-trifluoromethylphenylsulphide which boils under a pressure of 10 mm. at 103° C. to 105° C. is obtained from 3-nitro-1-trichloromethylphenylsulphide. By oxidizing this compound the 3-nitro-1-trifluoromethylphenylsulphone boiling under a pressure of 11 mm. at 146° C. to 148° C. is obtained.

The 3-nitro-4-chloro-1-trifluoromethylphenylsulphide boiling under a pressure of 17 mm. at 130° C. to 134° C. is obtained from 3-nitro-4-chloro-1-trichloromethylphenylsulphide.

(6) By causing in a manner similar to that described in the preceding examples technically anhydrous hydrogen fluoride or antimony trifluoride to act upon 3-trichloromethyl-1-trichloromethylphenylsulphide, the 3-trifluoromethyl-1-trifluoromethylphenylsulphide boiling at 155° C. is obtained. By oxidizing, there is obtained from this compound the 3-trifluoromethyl-1-trifluoromethylphenylsulphone of the formula:

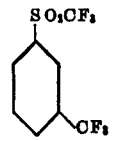

It is a liquid, clear as water, which boils under a pressure of 20 mm. at 93° C.

We claim:

1. The process which comprises causing a fluorinating agent of the group consisting of technically anhydrous hydrogen fluoride and antimony trifluoride to react at a temperature of about 50° C. to about 200° C. with a compound of the following general formula:

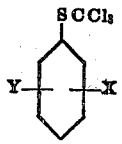

wherein X stands for a member of the group consisting of hydrogen, halogen, methyl, nitro, a $CF_3$- and a $SCCl_3$-group, and Y for a member of the group consisting of hydrogen and halogen.

2. The process which comprises causing a fluorinating agent of the group consisting of technically anhydrous hydrogen fluoride and antimony trifluoride to react at a temperature of about 50° C. to about 200° C. with a compound of the following general formula:

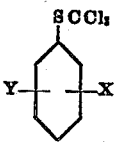

wherein X stands for a member of the group consisting of hydrogen, halogen, methyl, nitro, a $CF_3$- and a $SCCl_3$-group, and Y for a member of the group consisting of hydrogen and halogen, and oxidizing the trifluoromethyl-phenylsulphides thus obtained.

3. The process which comprises causing technically anhydrous hydrogen fluoride to react at a temperature of about 50° C. to about 150° C. with a compound of the following general formula:

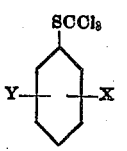

wherein X stands for a member of the group consisting of hydrogen, halogen, methyl, nitro, a $CF_3$- and a $SCCl_3$-group, and Y for a member of the group consisting of hydrogen and halogen.

4. The process which comprises causing technically anhydrous hydrogen fluoride to react at a temperature of about 50° C. to about 150° C. with a compound of the following general formula:

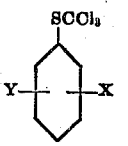

wherein X stands for a member of the group consisting of hydrogen, halogen, methyl, nitro, a $CF_3$- and a $SCCl_3$-group, and Y for a member of the group consisting of hydrogen and halogen, and oxidizing the trifluoromethyl-phenylsulphides thus obtained.

5. The compounds of the following general formula:

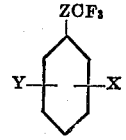

wherein Z stands for one of the group consisting of S and $SO_2$, X stands for a member of the group consisting of hydrogen, halogen, methyl, nitro, $CF_3$, $SCF_3$ and $SO_2CF_3$, Z being S in case X stands for $SCF_3$, and $SO_2$ in case X stands for $SO_2CF_3$, and Y stands for one of the group consisting of hydrogen and halogen, being partly solids, partly fluids.

6. The compounds of the following general formula:

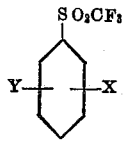

wherein X stands for a member of the group consisting of hydrogen, halogen, methyl, nitro, $CF_3$ and $SO_2CF_3$, and Y stands for one of the group consisting of hydrogen and halogen, being partly solids and partly fluids.

7. The compound of the following formula:

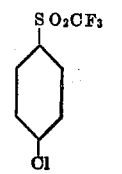

melting at 55° C. to 56° C.

8. The compound of the following formula:

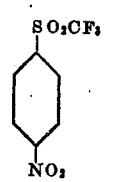

melting at 85° C. to 86° C.

FRITZ MÜLLER.
OTTO SCHERER.
WILLY SCHUMACHER.